(12) United States Patent
Ramirez Leano et al.

(10) Patent No.: US 10,525,961 B2
(45) Date of Patent: Jan. 7, 2020

(54) SYSTEM AND METHOD FOR THE DIAGNOSIS, EVALUATION AND PREDICTION OF LEAKAGES IN DIFFERENT HYDRAULIC CIRCUITS, QUICKLY AND SAFELY FOR THE OPERATOR

(71) Applicant: Sociedad Ramirez e Hijo Limitada, Calama (CL)

(72) Inventors: Miguel Angel Ramirez Leano, Calama (CL); Carlos Cristian Ramirez Leano, Calama (CL); Carlos Alberto Ramirez Ortiz, Calama (CL)

(73) Assignee: SOCIEDAD RAMIREZ E HIJO LIMITADA, Calama (CL)

( * ) Notice: Subject to any disclaimer, the term of this patent is extended or adjusted under 35 U.S.C. 154(b) by 88 days.

(21) Appl. No.: 15/668,304

(22) Filed: Aug. 3, 2017

(65) Prior Publication Data

US 2018/0037211 A1 Feb. 8, 2018

(30) Foreign Application Priority Data

Aug. 4, 2016 (CL) .................................. 201601969

(51) Int. Cl.
| | |
|---|---|
| *B60T 17/22* | (2006.01) |
| *G01M 3/28* | (2006.01) |
| *B60T 8/26* | (2006.01) |
| *F16D 66/02* | (2006.01) |
| *B60T 13/68* | (2006.01) |
| *F16D 66/00* | (2006.01) |
| *G01L 5/28* | (2006.01) |

(52) U.S. Cl.
CPC ............ *B60T 17/222* (2013.01); *B60T 8/266* (2013.01); *B60T 17/22* (2013.01); *F16D 66/021* (2013.01); *G01M 3/2815* (2013.01); *B60T 13/686* (2013.01); *F16D 2066/005* (2013.01); *G01L 5/28* (2013.01)

(58) Field of Classification Search
None
See application file for complete search history.

(56) References Cited

U.S. PATENT DOCUMENTS

| | | | | |
|---|---|---|---|---|
| 4,480,462 A | * | 11/1984 | Miller ...................... | G01M 3/26 73/37 |
| 2013/0061572 A1 | * | 3/2013 | Le Coq ..................... | F02K 1/16 60/226.2 |

FOREIGN PATENT DOCUMENTS

JP           2-141636 A       5/1990

* cited by examiner

*Primary Examiner* — Paul M. West
*Assistant Examiner* — Mark A Shabman
(74) *Attorney, Agent, or Firm* — Lucas & Mercanti, LLP

(57) ABSTRACT

Transportable system for the diagnosis, evaluation and prediction of leakages in hydraulic circuits of low pressure between 0 to 7 bar and of high pressure from 0 to 170 bar, quickly and safely for the operator is provided having a first independent circuit of high pressure and low flow and a second independent circuit of low pressure and high flow wherein the first independent circuit comprises: a first pressure subsystem, which delivers pressure to a first 4/3 valve with ports A, B, P and T, which is actuated by first solenoids, to deliver pressure to a first coupling A or to a first coupling B, in fluid communication with the ports A and B of the first 4/3 valve respectively a computer arranged to control the pressure of each pressure subsystem and associated method.

4 Claims, 5 Drawing Sheets

SYSTEM AND METHOD FOR THE DIAGNOSIS, EVALUATION AND PREDICTION OF LEAKAGES IN DIFFERENT HYDRAULIC CIRCUITS, QUICKLY AND SAFELY FOR THE OPERATOR

CROSS REFERENCE TO RELATED APPLICATION

This Application claims the priority of Chilean Patent Application No. 201601969 filed on Aug. 4, 2016, which is incorporated herein by reference.

FIELD OF THE INVENTION

The present invention relates to the oil-hydraulic machinery industry. In particular, the present invention relates to a diagnostic system and method to evaluate and predict failures in oil-hydraulic systems of different types of machinery, wherein the hydraulic systems may be final drive components, rotary unions, circuits in machinery, and halted mobile equipment. It should be mentioned that as final drive components are understood hopper lift cylinders, brake packs, actuating and central articulation cylinders of loaders, refrigeration systems or heat exchangers, cylinders, valves, coolers, among others.

DESCRIPTION OF THE RELATED ART

Nowadays it is common that, in the face of operating problems, the repair of systems, such as brakes, is carried out without prior diagnosis that includes pre-load testing of the set of final drive components, such as the wet brake (oil-cooled disc brakes), leading to loss of time in the assembly and disassembly of components, and even, causing greater damage to both the component and the machinery. When companies carry out maintenance and repairs without considering evaluations and diagnoses that enable to reduce the frequency of corrective maintenance, the equipment is halted, causing their availability in production processes to decrease, in addition to incurring costs associated with losses in expensive components and spare parts.

In general, the manufacturers of machinery and equipment that are typically used in mining operations and the contracting companies that operate or perform their maintenance, proceed to make repairs without taking into account the actual state of the hydraulic system of the machinery due to the lack of a system and method that allows the fast and efficient detection of internal leakage of hydraulic oil, wear of materials, deterioration of different hydraulic actuators and systems, such as failures in final drive reductions or stub hub bearings, among others, that produce contamination and loss of oils.

Today a rudimentary alternative of leaks evaluation is performed starting up the engine of the machinery to evaluate, removing the cap of the final drive or the stub hub and waiting for a period of two to eight hours to check if oil flows by the cap orifice. Whether oil flows through the orifice, it will hypothetically show that there is indeed internal leakage between the different hydraulic systems involved, but this entails slow tests and low reliability of the actual state of the hydraulic system.

In this operation, on average, all the oil (up to 4,000 liters) is lost both from the reductions of the final drives and stubs as well as from the brake cooling system. Likewise, spare parts are replaced unnecessarily.

The current method is not effective, since the systems pressure is not adequate to cause internal leakage, because the engine is at low RPM, not in normal running condition, and the oil is not at its working temperature, presenting higher viscosity and slower flow rate, which does not allow a good diagnosis. To the above is added a decrease in production per truck, having the trucks stopped for periods of time of around two to eight hours to check if oil flows through the cap orifice of the final drive or the stub hub.

As an example, in mining, the high cost of repairing or changing a final drive and wet brake together is approximately USD 130,000, owing, among other factors, to the time spent between 4 and 8 hours.

In view of this background there is a need for a diagnostic system and method to evaluate and predict failures in oil-hydraulic systems of different types of machinery without requiring to start the hydraulic pumps or the engines of the equipment to be evaluated, since getting started the hydraulic pumps or the motors for the diagnosis generates high costs, and can also cause accidents to maintenance personnel when the components of the hydraulic system to be evaluated are damaged.

Various systems and methods have been found that evaluate the leakage of hydraulic fluids in a hydraulic circuit, such as for example U.S. Pat. No. 4,480,462 disclosing a portable hydrostatic test apparatus for pressure testing of water-operated circuits. Hydraulic fluid is pressurized and serves as a source of pressure to feed a cylinder with central piston which in turn acts on cylinders of smaller diameter at its two ends to apply an intensified test pressure in a system filled with water. The apparatus includes a pneumatically operated control valve to actuate a directional control valve in the hydraulic system. These valves in the hydraulic system are mounted on and interconnected through an internally ported manifold to eliminate hoses. But this system is not designed to evaluate leaks of low pressure hydraulic circuits, for example between 0 to 6.89 bar, so it is unsafe for an operator trying to apply it to said hydraulic circuits, since a rupture of a hose may cause serious damage to the operators health and even death; this is because in addition to the operating pressure in the pump, the pressure is intensified by a set of cylinders and valves. In addition, the hydrostatic test is directed to detect leaks in piping circuits, having no relation to the evaluation of internal leakage in a hydraulic component, specifically oil-hydraulic, which is not a destructive test as it is in the U.S. Pat. No. 4,480,462.

Another document disclosing the diagnosis of internal leakage in a hydraulic system is JP2141636, which relates to early detection of internal leakage, wherein leakage evaluation is performed by measuring the loading times relative to a reference time or when the accumulated time of the no-load states do not reach the reference time; but this document does not solve the problem of the evaluation of hydraulic circuits of low and high pressure with a single system.

Finally, Chilean patent application CL 199701827 discloses a machine for diagnosing and evaluating internal leakage of oils in hydraulic systems, such as final drives, rotary unions or circuits in self-portable machinery; it has a low pressure hydraulic circuit and a high pressure hydraulic circuit with an electronic control system; its operating procedure evaluates the preloads of the work done in the final drive and stub hub bearings of the different mining machinery. This machine performs a diagnosis to determine if hydraulic machines need to preload or change seals in final drive components, stubs, and also cleans hydraulic systems; the machine operates through the connection to the two parallel hydraulic circuits: one of low pressure and other high pressure, which are electronically controlled, either in the safety system in the different commutations (hopper lift, brakes, internal leakage), with sound and visual alarm. However, this technology does not solve the problem of testing in low pressure and high pressure hydraulic circuits with an electronic control system and operating safely for the operator, without requiring high pressure or requiring high pressure pump of the hydraulic system to operate. In the prior art document it is not possible to handle pressures or independent flows, which involves greater risks for the operator.

The present system and method is oriented to the analysis and evaluation of detection of leaks such as oil-hydraulic ones, in final drive systems and brake packs of hydraulic mechanical type equipment, among others, used in mining and other industrial sectors which employ machinery with hydraulic circuits, which operate based on an automated system applied in the final drive set, such as the wet brake, which will verify the right operation of these components, allowing to reduce the maintenance thanks to a decrease in failures detection time because it provides an assertive diagnosis, thereby reducing the costs of repair and/or unplanned or emergency stop, fully adjusting to one of the economic objectives of productive industries, that is, costs reduction.

In order to solve the problem raised, a system and method for diagnosing, evaluating and predicting leakage in different hydraulic circuits is taught, independently for low pressure circuits between 0 to 7 bar and for high pressure circuits of 0 to 70 bar, which delivers results quickly, in less than 15 minutes, and safely for the operator. In the latter aspect it is emphasized that the system does not require the use of high pressure or the high pressure pump of the hydraulic system and prevents the system to be broken by accumulation of unwanted air. In addition, it can be arranged as a portable system or can be integrated into the hydraulic system of a machine with its own hydraulic circuit.

The present system and method for the diagnosis, evaluation and prediction of leaks also evaluates the state of preloads of the works done in final drive, stub hub bearings of the different machinery and mining equipment, and also allows to evaluate the need to change final drive seals and pre-loading (bearing set-up) of these machines.

DESCRIPTION OF THE INVENTION

It is presented a transportable system and method for the diagnosis, evaluation and prediction of leakages in hydraulic circuits of low pressure between 0 to 7 bar and of high pressure of 0 to 170 bar, quickly, in less than 15 minutes, and safely for the operator.

The system includes two independent hydraulic circuits, the first hydraulic circuit to perform high pressure and low flow diagnoses, and the second hydraulic circuit to perform low pressure and high flow diagnoses, and control and record means.

Each of the independent circuits comprises pressure subsystems for delivering pressure to 4/3 valves, corresponding to each circuit, actuated by first solenoids, pressure meters in both lines from and/or to the hydraulic circuit to be diagnosed; in which the high pressure circuit incorporates an hydraulic accumulator in communication with one of the lines of the circuit to be diagnosed. In the other hand, the low pressure circuit incorporates a dryer located on the return line.

The control and record means includes a computer arranged to receive pressure information from pressure meters in each line from or to the circuit to be diagnosed and to send control signals to the solenoids to control the position of the 4/3 valves. It includes a human-machine interface, peripheral devices to enter and obtain information for the operator. Thus, depending on the pressure readings and the system settings entered by the user, the system allows performing parallel diagnostic routines for high and low pressure systems.

It also incorporates a method that allows diagnosing and evaluating internal fluid leaks, mainly oil, in both the low pressure and high pressure circuits, such as hydraulic circuits of refrigeration or heat exchangers, diagnosing brake packages for water contamination, evaluating residual pressures, optionally raising a hopper without starting the machine's engine. In addition the low pressure system, from 0 bar to 7 bar, is suitable for diagnosing internal oil leaks, between the lubrication oil of final drive reductions and stub hub bearings, between the cleaning oil of the brake pack system and the brakes cooling system. By means of the high pressure system, the residual pressure of brake packs can be evaluated, the brakes can be disengaged and the lift of the hopper can optionally be carried out.

BRIEF DESCRIPTION OF THE DRAWINGS

The figures of the present invention are presented as an aid for the compression and reproduction thereof.

DETAILED DESCRIPTION OF THE INVENTION

Figure 1:
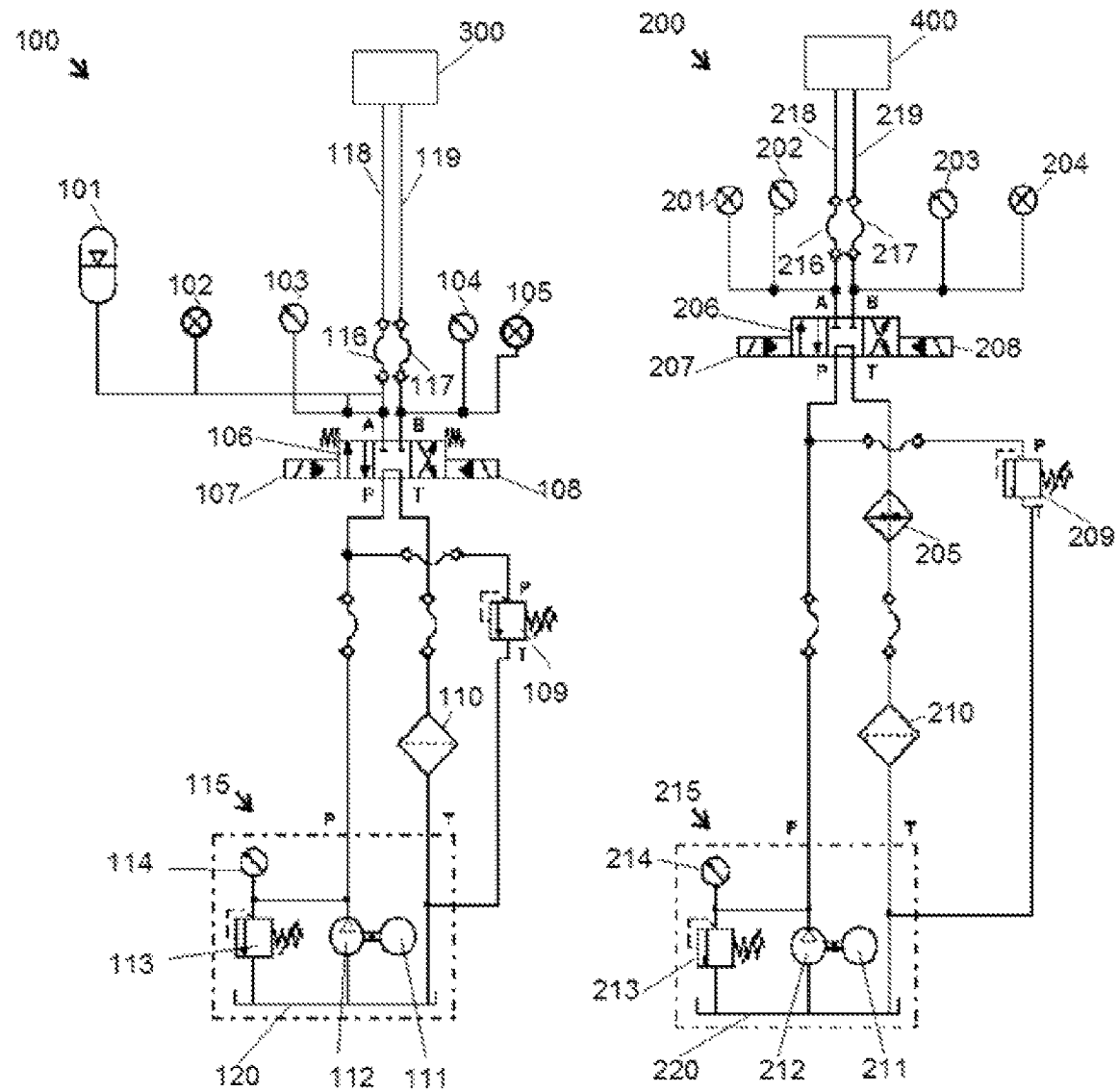
FIG. 1 shows a preferred hydraulic connection diagram of the present invention, connected to two circuits to be diagnosed.

In FIG. 1 the preferred embodiment of the present system is shown, in which the system is connected to hydraulic circuits (300, 400) belonging to the machinery to be diagnosed. In the presented connection configuration the two independent circuits (100, 200) of the system are shown, being connected to proceed to diagnose a high pressure circuit (300) and a low pressure circuit (400) respectively, so that the two independent circuits (100, 200) are not connected to each other. FIGS. 2 to 5 show alternative arrangements which may be adopted during the diagnosis of one or the other of the hydraulic circuits to be diagnosed (300, 400, 500).

As described, the present system is directed to the diagnosis, evaluation and prediction of leakages in low pressure hydraulic circuits between 0 to 7 bar and high pressure of 0 to 170 bar, quickly, in less than 15 minutes, and safely for the operator. The system comprises a first high pressure and low flow independent circuit (100) and a second low pressure and high flow independent circuit (200), and control and record means.

The first independent circuit (100) comprises a first pressure subsystem (115), which measures the pressure in the first pressure gauge (114), which delivers pressure to a first 4/3 valve (106) (i.e., 4 ports A, B, P and T, and 3 positions as indicated in the figures), which is actuated by first solenoids (107, 108) to deliver pressure to a first coupling A (116) or to a first coupling B (117) in fluid communication with ports A and B of first 4/3 valve (106) respectively, said first couplings A and B (116, 117) for connection to the connecting port(s) of a hydraulic circuit to be evaluated; a first pressure meter A (102) of pressure gauge (103) located in a first pressure line A, connected to port A of first 4/3 valve (106); a first pressure meter B (105) of pressure gauge (104), located in a first pressure line B, connected to port B of first 4/3 valve (106); wherein the first pressure subsystem (115) comprises: a first motor (111), a first pump (112), a first pressure regulator (113) and a first return tank (120); wherein the first motor (111) drives the first pump (112), and the first pressure regulator (119), which prevents the pressure of the first pressure subsystem (115) from exceeding the limit of the first pump (112); a hydraulic accumulator (101) connected to the first pressure line A to maintain the pressure imposed by the first pump (112) once it is stopped.

Whereas the second independent circuit (200) comprises: a second pressure subsystem (215), which delivers pressure to a second 4/3 valve (206) with ports A, B, P and T, which is actuated by a second solenoids (207, 208), to deliver pressure to second coupling A (216) or second coupling B (217), in fluid communication with ports A and B of second 4/3 valve (206) respectively, said second couplings are useful for connection to the connecting port(s) of a hydraulic circuit to be evaluated; a second pressure meter A (201) of pressure gauge (202), located in a second pressure line A, connected to port A of the second 4/3 valve (206); a second pressure meter B (204) of pressure gauge (203), located in a second pressure line B, connected to port B of second 4/3 valve (206); wherein the second pressure subsystem (215) comprises: a second motor (211), a second pump (212), a second pressure regulator (213) and a second return tank (220); wherein the second motor (211) drives the second pump (212), and the second pressure regulator (219), which prevents the pressure of the second pressure subsystem (215) from exceeding the limit of first pump (212); a drier (205) is located on the return line, in fluid communication with port T of second 4/3 valve (206).

For the control and data record implementation the system has a computer, which receives pressure information from first pressure meter A (102), first pressure meter B (105), second pressure meter A (201) and second pressure meter B (204), which stores in information storage means (not shown in the figures), and sends signals to first solenoids (107, 108) and second solenoids (207, 208) depending on pressure readings and the instructions and settings entered to the system by the operator.

In each embodiment, the computer has software that implements the control logic, which allows interaction with the operator through a human-machine interface (HMI), the control of the system valves via electrical signals directed to the solenoids, and keeping records of the measured parameters. So that, the computer is fed with data sent from the pressure meters installed in the system, and checks the operating conditions against parameters preset by the operator.

The respective method for the diagnosis, evaluation and prediction of leakages in hydraulic circuits of low pressure, between 0 to 7 bar and of high pressure of 0 to 170 bar, which for evaluating of a simple effect equipment with high pressure hydraulic circuit comprises the following steps:

configuring the pressure of a first independent circuit (100), by entering a setpoint and an inferior setpoint in a computer, which controls pressure and receives pressure information through a first pressure meter A (102) and a first pressure meter B (105), and storing the pressure information in the information storage means throughout the diagnosis;

connecting a first coupling A (116) to a first line A (118), which is a connection port of a simple effect equipment to be evaluated;

starting up a first pressure subsystem (115) so that a first motor (111) operates and drives a first pump (112) by electric control, feeding pressure through the port P of a first 4/3 valve (106) with ports A, B, P and T;

actuating the first 4/3 valve (106), by electrical control of a first solenoid (107, 108), to connect port A with P and port B with T, to actuate the simple effect equipment;

comparing the pressure of the first pressure meter A (102) with respect to the setpoint, by the computer, to stop the actuation of the first pressure subsystem (115) once the setpoint is reached, leaving the pressure of the first independent circuit (100), held by an accumulator (101);

comparing the pressure of the first pressure meter A (102) with respect to the inferior setpoint, by the computer, to indicate the failure by screen if the measured pressure decreases below the inferior setpoint within a time previously entered by the operator;

processing the information and delivering the tightness results of the first independent circuit (100), through a screen of a human-machine interface; and relieving pressure from the first line A (118), connecting the port A with T and port B with P in the first 4/3 valve (106), to terminate the test.

While performing the high pressure test, the second independent circuit (200) and its second pressure subsystem (215) are fully available for performing operational testing of low pressure equipment or components. This is totally independent of the test at high pressure and with greater safety, for example, by not involving connections or reductions from high pressure in circuits that are not designed to support it.

Alternatively the system considers the connection of the first independent circuit (100), via the first coupling A (116) and the second independent circuit (200) via the second coupling A (216), to connection ports of an equipment (500) with opened hydraulic circuit. In this case, the diagnostic methodology is adapted so that the corresponding method comprises:

configuring the pressure of a second independent circuit (200), by entering a setpoint on a computer which controls the pressure, which receives pressure information from a second pressure meter A (201) and a second pressure meter B (204), and stores the pressure information in the information storage means throughout the diagnosis;

connecting the second coupling A (216) to a second line A (218), which is an input port of the open hydraulic circuit equipment to be evaluated;

connecting the first coupling A (116) to a first line A (118), which is an output port of the open hydraulic circuit equipment to be evaluated;

starting up a second pressure subsystem (215) so that a second motor (211) operates and drives a second pump (212) by electric control, feeding pressure through the port P of a second 4/3 valve (206) with ports A, B, P and T;

actuating the second 4/3 valve (206) by electrical control of a second solenoids (207, 208), to connect the port A with P and port B with T, for feeding pressure to the equipment (500) while the first 4/3 valve (106) is remained unactuated, thereby connecting its port P with T while its port A and B are kept blocked to generate pressure in the system;

comparing the pressure of the second pressure meter A (201) with respect to the setpoint, by the computer, to stop the actuation of the second pressure subsystem (215), once the setpoint is reached, leaving the pressure of the system held by an accumulator (101);

processing the information and delivering the tightness results of the second independent circuit (200), after a time has elapsed, previously entered by the operator, through a screen of a human-machine interface; and relieving pressure from the second line A (218), connecting the port A with T and port B with P in the second 4/3 valve (206), to terminate the test.

Advantages of the System

The technology disclosed by the present system has characteristics and/or advantages such as:

Controlling of the operating functions by means of a selection menu that is shown in the supervision screen.

Autonomy in relation to the equipment to be diagnosed.

Possibility of being installed in a mining machine or other equipment.

It can be provided as independent diagnostic equipment, with a compact size, allowing it to be transported, for example, to sites of difficult access.

Simple installation and removal from the machinery to be evaluated, it might be complemented with an assortment of quick connections combined with a variety of hydraulic adapters, according to convenience for each equipment to be evaluated.

Ease of deal with and operation.

Data reception and analysis in machine by expert control.

Online data and diagnostics delivery.

Greater safety by not requiring the high pressure pump to be operated when diagnosing low pressure hydraulic systems.

It allows handling pressures and flows independently, providing greater reliability.

The present technology generates savings at the time of the symptomatic and predictive diagnosis, in addition it reduces the maintenance time to less than 15 minutes, instead of 4 to 8 hours, saving resources like oil and working hours, used in that process, bearing in mind the work of repair or maintenance is performed with minimum exposure of personnel that deal with the machinery, preventing potential accidents at work and contamination by exhaust gases or liquid spills. With this effective diagnosis increases the time between failures or availability of machines, a very relevant subject of mining industries, earth moving, construction, or any one that requires hydraulic machinery. To contextualize the economic impact that could be generated, let us consider, for example, only 40% of the fleet in monthly maintenance, out of a total of 264 trucks, the loss due to mineral extraction would be reduced between USD 16 million to USD 36 million, thinking about the total production capacity of the fleet, that is, about USD 18 million, only taking the 15 minutes that each truck will lose in the maintenance process due to the intervention of the machine with the present diagnostic system and method.

Figure 2:
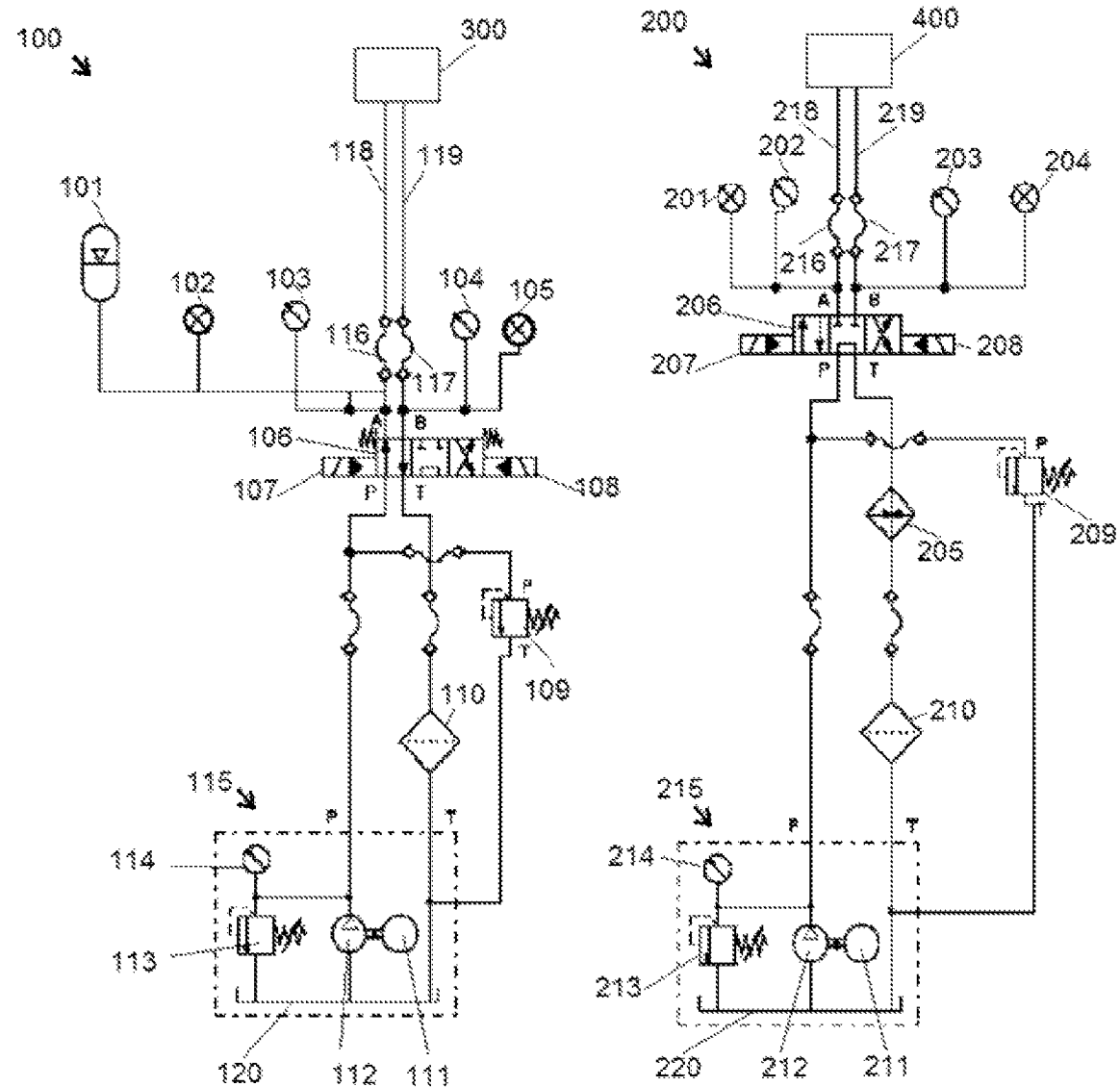
FIG. 2 shows a preferred hydraulic connection diagram of the present invention, in a diagnostic arrangement.
Figure 3:
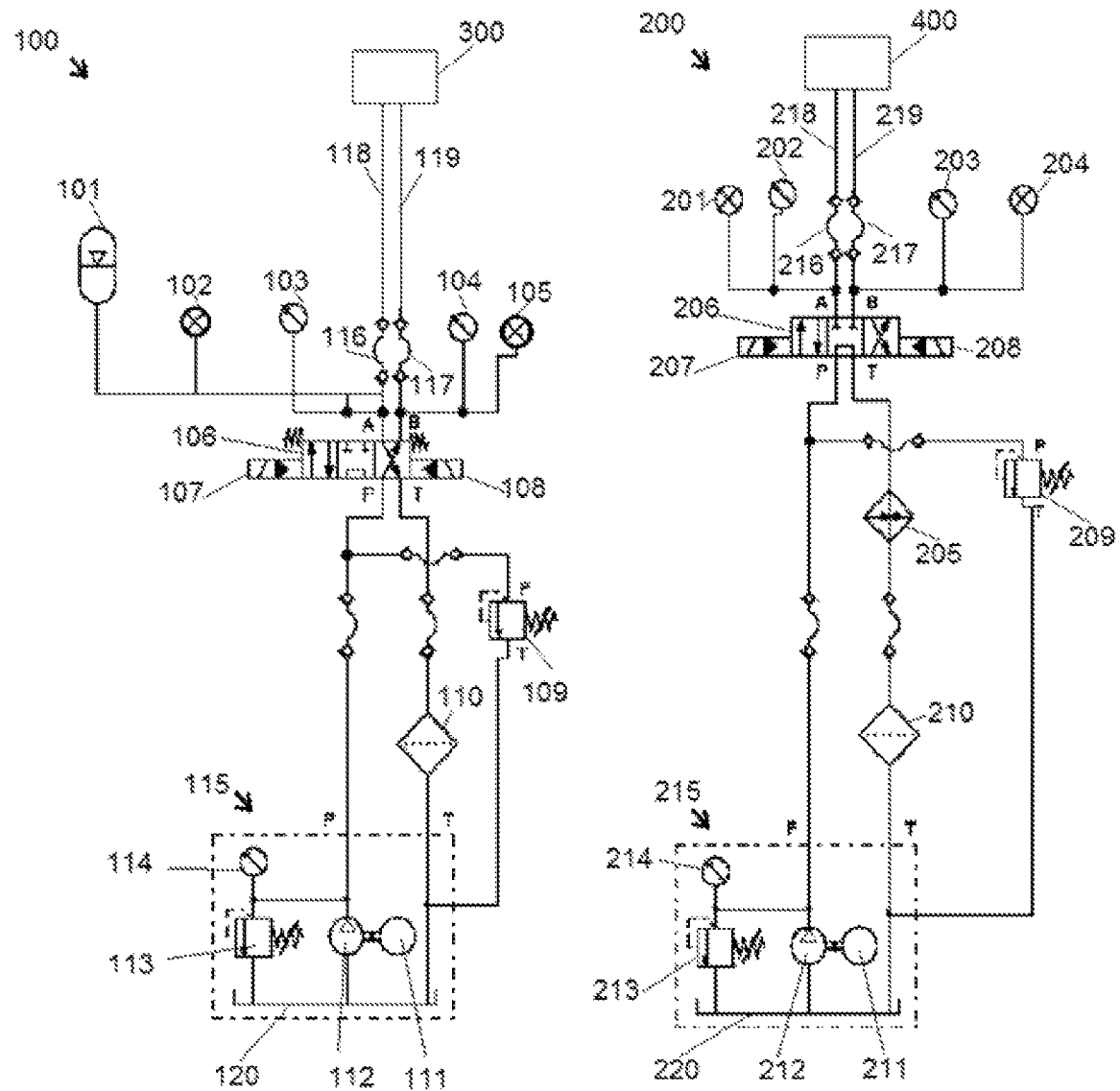
FIG. 3 shows a preferred hydraulic connection diagram of the present invention, in an alternative diagnostic arrangement.

Example of Use No 1 (FIGS. 1, 2, 3)

The use of the diagnostic system of the present application on the evaluation of a hopper truck will allow, for example, to evaluate internal oil leaks in the hopper lift circuit. Further to performing the hopper lift several accessory movements that do not require high pressure can be effected, independently of the hopper, without the need to start up the equipment or machinery being serviced. During the evaluation, the present system keeps records of measured parameters and behavior of components in the storage means of the computer, not shown in the figures.

In this case, the hydraulic circuit (300), corresponding to a single effect device or actuator, is evaluated using the first independent circuit (100), see FIG. 1, the first coupling A (116) is connected to the input port of the equipment—the first line A (118)—, the first pressure subsystem (115) is launched to operate the first pump (112), driven by an electric motor (111), feeding the port P to the 4/3 valve (106). The position of valve (106) is adjusted by electrical control of the first solenoids (107, 108), see FIG. 2, connecting the port A with P and the port B with T (return to tank). Thus feeding pressure to the first line A (118) to perform the hopper lift.

The system pressure is monitored by a pressure transducer, which corresponds to the first pressure meter A (102). The valve (109) limits the system pressure if the operating pressure of the first pump (112) of the first pressure subsystem (115) is exceeded. The pressure required for this function is controlled by a computer, which records the measurements from the pressure meters A (102) and B (105), after entering the setpoint corresponding to the pressure required by the operator, which can be made, for instance, on an HMI screen, as required by the system.

Once the required pressure is reached, the system stops the drive, allowing a visual inspection of the machinery under evaluation.

In normal operation the system will request the operator to release pressure, which is achieved by sending a control signal to the solenoids (107, 108) of the first 4/3 valve (106), to return to the position shown in FIG. 3, connecting port A with T.

Example of Use No 2 (FIGS. 1, 2, 3)

In a second example of use of the system of the present application we will see the disengagement of brakes. In particular brake disengagement is possible through the present system, not only in equipment staying at workshops, but also in the ground. For this purpose, the present system is constituted in a portable diagnostic equipment, being able to be transported in a vehicle, such as a pickup.

In this case, the methodology for simple effect equipment is used, with a connection similar to that described previously for the hopper lift (FIG. 1), connecting the first coupling A (116) to the input port of the equipment, the first Line A (118). The circuit to be evaluated (300), corresponding to the brake circuit, is then fed by the first circuit (100), which is capable of delivering high pressure and low flow, through the operation of the first pressure subsystem (115) and adjusting the position of valve (106), to connect port A with P and port B with T (according to FIG. 2).

The system pressure is monitored by a pressure transducer, which corresponds to the first pressure meter A (102).

The valve (109) limits the system pressure if the operating pressure of the first pump (112) of the first pressure subsystem (115) is exceeded. The pressure required for this function is controlled by a computer, which records the measurements from the pressure meters A (102) and B (105), after entering the setpoint corresponding to the pressure required by the operator, which can be made, for instance, on an HMI screen, as required by the system.

Once the required pressure is reached, the system stops all components, leaving only the pressure retained with the accumulator (101).

To apply brakes, the operator will be instructed to release pressure, which is achieved by sending a control signal to the solenoids (107, 108) of the 4/3 valve (106), to connect port A with T (tank), see FIG. 3.

Example of Use No 3 (FIGS. 1, 2, 3)

In a further example of use of the system of the present application, we will see its application to the residual pressure evaluation of brake packs of an equipment, either at workshop or in the ground.

In this case, the methodology for simple effect equipment is used, with a connection similar to that described in the previous examples (FIG. 1), similar feeding (high pressure and low hydraulic flow through the first pressure subsystem 115, according to FIG. 2) and pressure monitoring by the first pressure meter A (102).

Once the required pressure is reached, previously entered by the operator and corresponding to a setpoint, the system stops all components, leaving only the pressure retained with the accumulator (101). The system monitors the pressure by the first pressure meter A (102), which is then processed in the computer and stored in the storage means. If the pressure drops below an inferior setpoint (lower than the setpoint), which has also been previously entered by the operator through the HMI, the system will indicate the failure on the screen.

The behavior of the pressure at all times will be recorded in an on-screen chart and the acquired data of pressure behavior can be backed up by means of a storage unit.

Upon completion of the evaluation, the system will request the operator to instruct release of pressure to apply the equipment brakes, which is achieved by sending a control signal to the solenoids (107, 108) of the 4/3 valve (106), to connect port A with T (tank), see FIG. 3.

This methodology can also be used for the evaluation and diagnosis of brake packs, leaks evaluation in brake packs, or evaluating hydraulic circuits, in general, which include valves.

Figure 4:
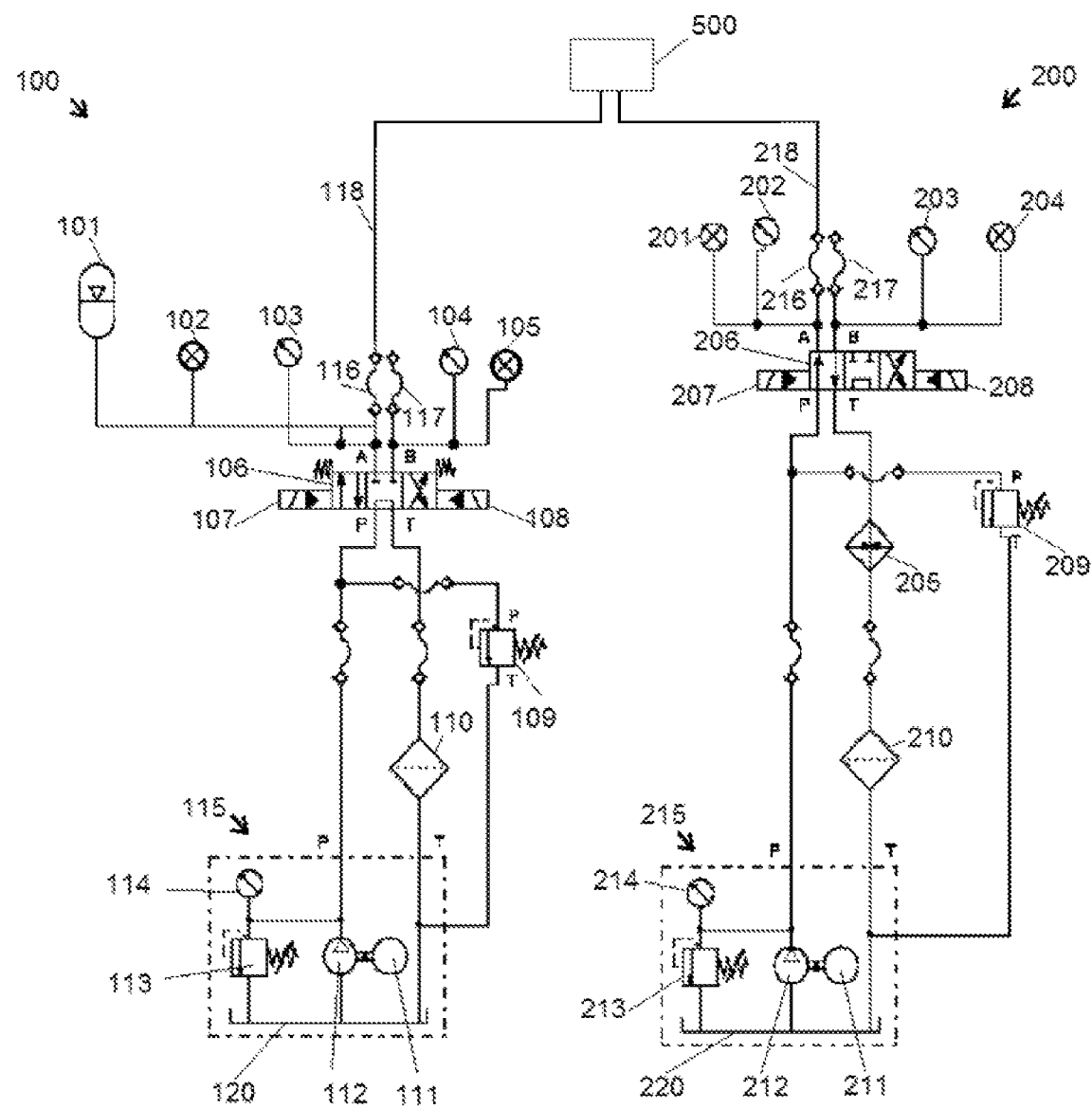
FIG. 4 shows a preferred hydraulic connection diagram of the present invention, in another diagnostic arrangement.

Example of Use No 4 (FIG. 4)

In a further example of use of the system of the present application, we will see its application to the diagnosis of the existence of internal leaks of brake cooling oil. Therefore, being a particular case of an open hydraulic circuit.

The evaluation of the brake cooling system (500), with reference to FIG. 4, is performed using the second independent circuit (200), which provides low pressure flow between 0 and 7 bar, by connection of the second coupling A (216) to the input port of the brake cooling system—the second line A (218)—. In addition, the first independent circuit (100) is used, by connecting the first coupling A (116), to the return or output of the brake cooling system—through the first line A (118)—.

The second pressure subsystem (215) is launched to operate the first pump (212), by electrical control of the motor (211), feeding pressurized oil through the port P to the 4/3 valve (206). The position of valve (206) is adjusted by electrical control of the first solenoids (207, 208), see FIG. 3, connecting port A with P and port B with T (return to tank), which return by the first filter (110). Thus pressure is delivered to the first line A (218), in order to feed the inlet of the brake cooling system (500).

The connection to the first independent circuit (100) makes it possible to use the center return position of the valve (106), which connects port P with T, while port A and B are kept blocked to generate pressure in the system. In addition, this connection serves to release the system pressure once the diagnosis is finished.

The system pressure is monitored by a pressure transducer, corresponding, in this case, to the second pressure meter A (201). The valve (209) limits the system pressure if the operating pressure of the pump (212) of the first pressure subsystem (215) is exceeded. The pressure required for this function is controlled by a computer, and the pressure is measured in the second pressure gauge (214), which records the measurements from the pressure meters A (201) and B (204), after entering the setpoint corresponding to the pressure required by the operator via HMI screen.

Once the required pressure is reached, previously entered by the operator and corresponding to a setpoint, the system stops all components, leaving only the pressure retained with the accumulator (101).

This test is performed during a time determined by the operator, but controlled by the system and control strategy.

Having finished the test, the system will request the operator to release pressure by sending a control signal to the solenoids (107, 108) of the valve (106) to relieve system pressure by connecting port A with T.

Figure 5:
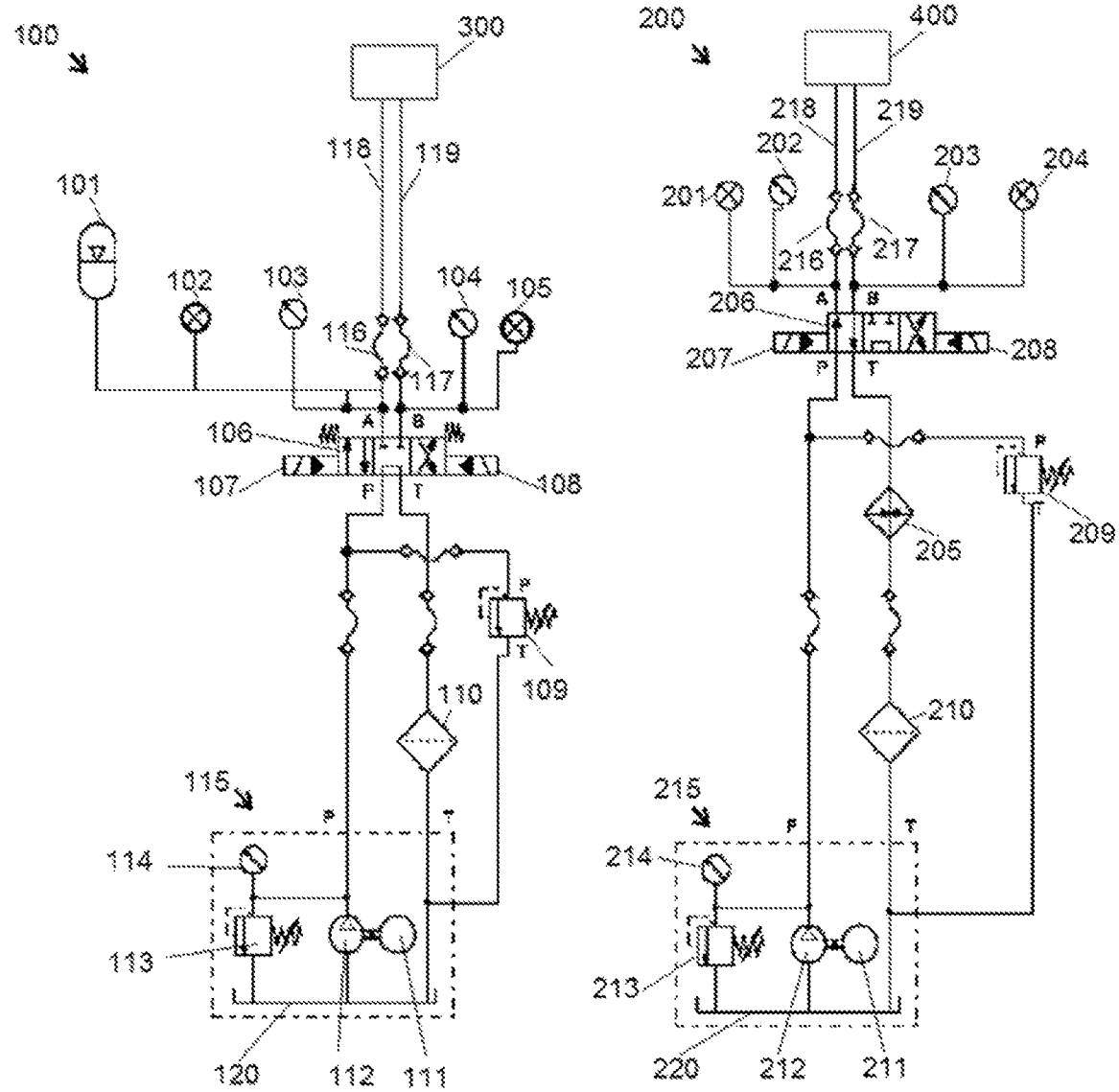
FIG. 5 shows a preferred hydraulic connection diagram of the present invention, in another diagnostic arrangement.

Example of Use No 5 (FIGS. 1, 5)

In a further example of use of the system of the present application, we will see its application to the cleaning of the brake cooling system (400).

By using the second independent circuit (200), of low pressure between 0 and 7 bar, by connection (see FIG. 1) of the second coupling A (216) to the inlet port of the brake cooling system—the second line A (218)—and by connecting the second coupling B (217) to the return of the brake cooling system—through the second line B (219)—.

The second pressure subsystem (215) is launched to operate the first pump (212), by electrical control of the motor (211), feeding pressurized oil through the port P to the 4/3 valve (206). The position of valve (206) is adjusted by electric control of the first solenoids (207, 208), see FIG. 5, connecting port A with P and port B with T (return to tank). Thus pressure is delivered to the first line A (218), in order to feed the inlet of the brake cooling system.

In this way, the fluid in the brake cooling system (400) will be recirculated by the dryer (205) and the second filter (210) located in the return line between the second 4/3 valve (206) and the second tank (220) of the second pressure subsystem (215), for removing moisture and impurities.

The cleaning is performed during a time determined by the operator, but controlled by the system. Once completed, the system stops all components and requests the operator to send a control signal to the solenoids (207, 208) of the 4/3 valve (206), to connect port P with T (tank), FIG. 1.

Example of Use No 6 (FIG. 5)

In a further example of use of the system of the present application, we will see its application to the evaluation and diagnosis of joint preloads of final drive—wet brake (system 400).

The second independent circuit (200), of low pressure between 0 and 7 bar, is used, by connection of the second coupling A (216) to the input port of the system (400)—the second line A (218)—and by connection of the second coupling B (217) to the return of the brake cooling system—through the second line B (219)—.

The second pressure subsystem (215) is launched to operate the first pump (212) by electric control of motor (211), feeding by port P to the 4/3 valve (206). The position of the valve (206) is adjusted by electric control of the first solenoids (207, 208), see FIG. 5, connecting port A with P and port B with T. Thus pressure is delivered to the first line A (218), in order to feed the inlet of the final drive-wet brake assembly.

The pressure of the system is monitored by a pressure transducer, which corresponds to the second pressure meter A (201). The valve (209) limits the system pressure if the operating pressure of the second pump (212) of the second pressure subsystem (215) is exceeded. The pressure required for this function is controlled by computer, which records the measurements from the pressure meters A (201) and B (204), after entering the setpoint, corresponding to the pressure required by the operator, which can be made, for example, on an HMI screen, as required by the system. In case of exceeding the pressure entered, the system stops all the components.

Finally, the system will request the operator to release pressure, which is achieved by sending a control signal to the solenoids (107, 108) of the first 4/3 valve (106), to return to the indicated position in FIG. 1, connecting port P with T.

Additionally, the system of the present application can be applied for the test of a final drive—wet brake before assembly.

Example of Use No 7. In-Line Evaluation and Diagnosis of Oil

Diagnosis and evaluation of oil contamination through an equipment inserted in the same line of the machinery.

The invention claimed is:

1. A transportable system for the diagnosis, evaluation and prediction of leakages in hydraulic circuits, the transportable system comprising a first independent circuit and a second independent circuit,
   wherein the first independent circuit comprises:
     a first pressure subsystem, which delivers pressure to a first 4/3 valve with first ports A, B, P and T, which is actuated by a plurality of first solenoids, to deliver pressure to a first coupling A or to a first coupling B, in fluid communication with the first ports A and B of the first 4/3 valve respectively, said first couplings for connection with one or more first connection ports of a first equipment to be evaluated; a first pressure meter A, located in a first pressure line A, connected to the first port A of the first 4/3 valve; a first pressure meter B, located in a first pressure line B, connected to the first port B of the first 4/3 valve; wherein the first pressure subsystem comprises: a first motor, a first pump, a first pressure regulator and a first return tank; wherein the first motor drives the first pump and the first pressure regulator, which prevents the pressure of the first pressure subsystem from exceeding a first limit of the first pump; and an accumulator connected to the first pressure line A, in order to maintain the pressure imposed by the first pump, once the pump is stopped;
   and wherein the second independent circuit comprises:
     a second pressure subsystem, which delivers pressure to a second 4/3 valve with second ports A, B, P and T, which is actuated by a plurality of second solenoids, to deliver pressure to a second coupling A or a second coupling B, in fluid communication with the second ports A and B of the second 4/3 valve respectively, said second couplings for connection with one or more second connection ports of a second equipment to be evaluated;
     a second pressure meter A, located in a second pressure line A, connected to the second port A of the second 4/3 valve; a second pressure meter B, located in a second pressure line B, connected to the second port B of the second 4/3 valve;
     wherein the second pressure subsystem comprises: a second motor, a second pump, a second pressure regulator and a second return tank; wherein the second motor drives the second pump and the second pressure regulator, which prevents the pressure of the second pressure subsystem from exceeding a second limit of the second pump; and
     a drier located on a return line which is in fluid communication with the second port T of the second 4/3 valve;
   wherein a computer arranged to control the pressure of each pressure subsystem receives pressure information from the first pressure meter A, the first pressure meter B, the second pressure meter A and the second pressure meter B, and stores the pressure information in an information storage means and sends signals to the plurality of first solenoids and the plurality of second solenoids, in accordance to the pressure readings and an initial configuration entered to the system by the operator, through a human-machine interface.

2. The transportable system for the diagnosis, evaluation and prediction of leakages according to claim 1, further comprising a first connection between the first independent circuit and one or more third connection ports of an open hydraulic circuit equipment to be evaluated, via the first coupling A, and a second connection between the second independent circuit and one or more fourth connection ports of the open hydraulic circuit equipment to be evaluated, via the second coupling A.

3. A method for the diagnosis, evaluation and prediction of leakage in hydraulic circuits the method comprising:
   performing a first test of a first hydraulic equipment having a first pressure range by performing the steps of:
     a) configuring a pressure of a first independent circuit by entering a setpoint and an inferior setpoint on a computer which controls the pressure and receives pressure information, through a pressure meter A and a pressure meter B, and stores the pressure information in an information storage means during diagnosis;
     b) connecting a coupling A to a line A, which is a connection port of a simple effect equipment to be evaluated;
     c) starting up a first pressure subsystem so that a motor operates and drives a pump by electric control, feeding pressure through a port P of a 4/3 valve with ports A, B, P and T;

d) actuating the 4/3 valve by electrical control of a plurality of first solenoids, to connect port A with port P and port B with port T, to actuate the simple effect equipment;

e) comparing the pressure of the pressure meter A with respect to the setpoint, by the computer, to stop the actuation of the first pressure subsystem once the setpoint is reached;

f) comparing the pressure of the pressure meter A with respect to the inferior setpoint, by the computer, to indicate a failure by screen, if the measured pressure decreases below the inferior setpoint within a time previously entered by an operator; and g) relieving the pressure from the line A, connecting the port A with port T and port B with port P in the 4/3 valve, to terminate the first test;

wherein, while performing the first test, a second independent circuit and a second pressure subsystem associated with the second independent circuit are used to perform a second test of a second hydraulic equipment having a second pressure range, independently of the first test.

4. A method for the diagnosis, evaluation and prediction of leakages in hydraulic circuits, the method comprising:

performing a test of a hydraulic equipment by performing the steps of:

a) configuring a pressure of a first independent circuit, by entering a setpoint on a computer which controls the pressure, receives pressure information from a first pressure meter A and a first pressure meter B, and stores the pressure information in an information storage means;

b) connecting a first coupling A to a first line A, which is an input port of an open hydraulic circuit equipment to be evaluated;

c) connecting a second coupling A to a second line A, which is an output port of the open hydraulic circuit equipment to be evaluated;

d) starting up a first pressure subsystem so that a motor operates and drives a pump by electric control, feeding pressure through a port P of a first 4/3 valve with first ports A, B, P and T;

e) actuating the first 4/3 valve by electrical control of a first plurality of solenoids, to connect the first port A with the first port P and the first port B with the first port T, for feeding pressure to the equipment, while a second 4/3 valve with second ports A, B, P, and T remains unactuated, thus connecting the second port P with the second port T, while the second port A and the second port B are blocked to generate pressure;

f) comparing the pressure of the first pressure meter A with respect to the setpoint, by the computer, to stop the actuation of the first pressure subsystem once the setpoint is reached; and g) relieving pressure from the first line A, connecting the first port A with first port T and first port B with first port P in the first 4/3 valve, to terminate the test;

monitoring a first actuating pressure by the first pressure meter A and the first pressure meter B;

monitoring a second actuating pressure by a second pressure meter A and a second pressure meter B;

comparing the working pressure of a second independent circuit and comparing the working pressure of the first independent circuit with respect to a predetermined pressure set in the computer, during the entire operation;

storing work pressure information in the information storage means; and stopping the first pressure subsystem and stopping a second pressure subsystem to terminate the test.

* * * * *